(12) United States Patent
Wang et al.

(10) Patent No.: US 11,425,304 B1
(45) Date of Patent: Aug. 23, 2022

(54) REDUCING GLOBAL MOTION AND ROLLING SHUTTER IN A DUAL CAMERA SYSTEM

(71) Applicant: Black Sesame Technologies Inc., San Jose, CA (US)

(72) Inventors: Chao Wang, Shanghai (CN); Zhaowei Xin, Xuchang (CN); Donghui Wu, San Mateo, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/543,400

(22) Filed: Dec. 6, 2021

(51) Int. Cl.
*H04N 5/232* (2006.01)
*H04N 5/353* (2011.01)
*G06T 7/292* (2017.01)

(52) U.S. Cl.
CPC ......... *H04N 5/23267* (2013.01); *G06T 7/292* (2017.01); *H04N 5/23277* (2013.01); *H04N 5/3532* (2013.01); *G06T 2207/20201* (2013.01)

(58) Field of Classification Search
CPC .......... G06T 2207/20201; G06T 7/292; H04N 5/2329; H04N 5/23267; H04N 5/23277; H04N 5/3532
See application file for complete search history.

(56) References Cited

U.S. PATENT DOCUMENTS

| 8,184,926 | B2 | 5/2012 | Sun et al. | |
|---|---|---|---|---|
| 8,406,564 | B2 | 3/2013 | Sun et al. | |
| 8,547,441 | B2 | 10/2013 | Ben-Ezra et al. | |
| 9,036,032 | B2 * | 5/2015 | Ishii | H04N 5/23248 348/208.4 |
| 9,749,534 | B2 * | 8/2017 | Martinello | G06T 5/20 |
| 10,311,560 | B2 * | 6/2019 | Sang | G06N 3/0454 |
| 2015/0130954 | A1 * | 5/2015 | Hyun | H04N 5/23258 348/208.2 |
| 2017/0006240 | A1 * | 1/2017 | Sron | H04N 5/357 |
| 2020/0128161 | A1 * | 4/2020 | Kroekel | H04N 5/23218 |
| 2022/0150453 | A1 * | 5/2022 | Lee | H04N 9/04515 |

FOREIGN PATENT DOCUMENTS

WO    WO-2019059562 A1 *  3/2019 ............. H04N 5/225

OTHER PUBLICATIONS

Gupta et al, Single image deblurring using motion density functions, ECCV'2010.

* cited by examiner

*Primary Examiner* — Chiawei Chen
(74) *Attorney, Agent, or Firm* — Timothy T. Wang; Hi Wang & Massand, PLLC

(57) ABSTRACT

A method to reduce a motion blur and a rolling shutter effect, comprising, receiving a main image frame, a main timing and a main exposure from a main camera, receiving a secondary image frame, a secondary timing and a secondary exposure from a secondary camera, correcting the secondary image frame to the main image frame, determining a delta timing based on the main timing and the secondary timing, determining a delta exposure based on the main exposure and the secondary exposure, determining a discrete motion of offset sequences based on the secondary image frame, determining a row-wise motion blur kernel based on the main image frame and the discrete motion of offset sequences and determining a spatially varying kernel deconvolution based on the main image frame and the row-wise motion blur kernel.

10 Claims, 14 Drawing Sheets

REDUCING GLOBAL MOTION AND ROLLING SHUTTER IN A DUAL CAMERA SYSTEM

BACKGROUND

Technical Field

The instant disclosure is related to blur reduction and more specifically to global motion and rolling shutter reduction in a dual camera system.

Background

Currently, capturing a scene in low light extends the exposure time of a frame, rendering it susceptible to shaking, thus causing global motion blur in an output image.

Commonly used commercial cameras typically capture images with a rolling shutter, which may produce unwanted artefacts in the presence of motion.

SUMMARY

An example dual camera system, comprising a main camera with a rolling shutter and a second camera with a global shutter.

An example method to simultaneously reduce a motion blur and a rolling shutter effect, comprising, receiving a main image frame, a main timing and a main exposure from a main camera, receiving a secondary image frame, a secondary timing and a secondary exposure from a secondary camera, correcting the secondary image frame to the main image frame, determining a delta timing based on the main timing and the secondary timing, determining a delta exposure based on the main exposure and the secondary exposure, determining a discrete motion of offset sequences based on the secondary image frame, determining a row-wise motion blur kernel based on the main image frame and the discrete motion of offset sequences and determining a spatially varying kernel deconvolution based on the main image frame and the row-wise motion blur kernel.

Another example method to simultaneously reduce a motion blur and a rolling shutter effect, comprising, receiving a main image frame, a main timing and a main exposure from a main camera, receiving a secondary image frame, a secondary timing and a secondary exposure from a secondary camera, determining a delta timing based on the main timing and the secondary timing, determining a delta exposure based on the main exposure and the secondary exposure, determining a discrete motion of offset sequences based on the secondary image frame, determining a row-wise motion blur kernel based on the main image frame and the discrete motion of offset sequences, remapping the row-wise motion blur kernel to the main image frame and determining a spatially varying kernel deconvolution based on the main image frame and the row-wise motion blur kernel.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
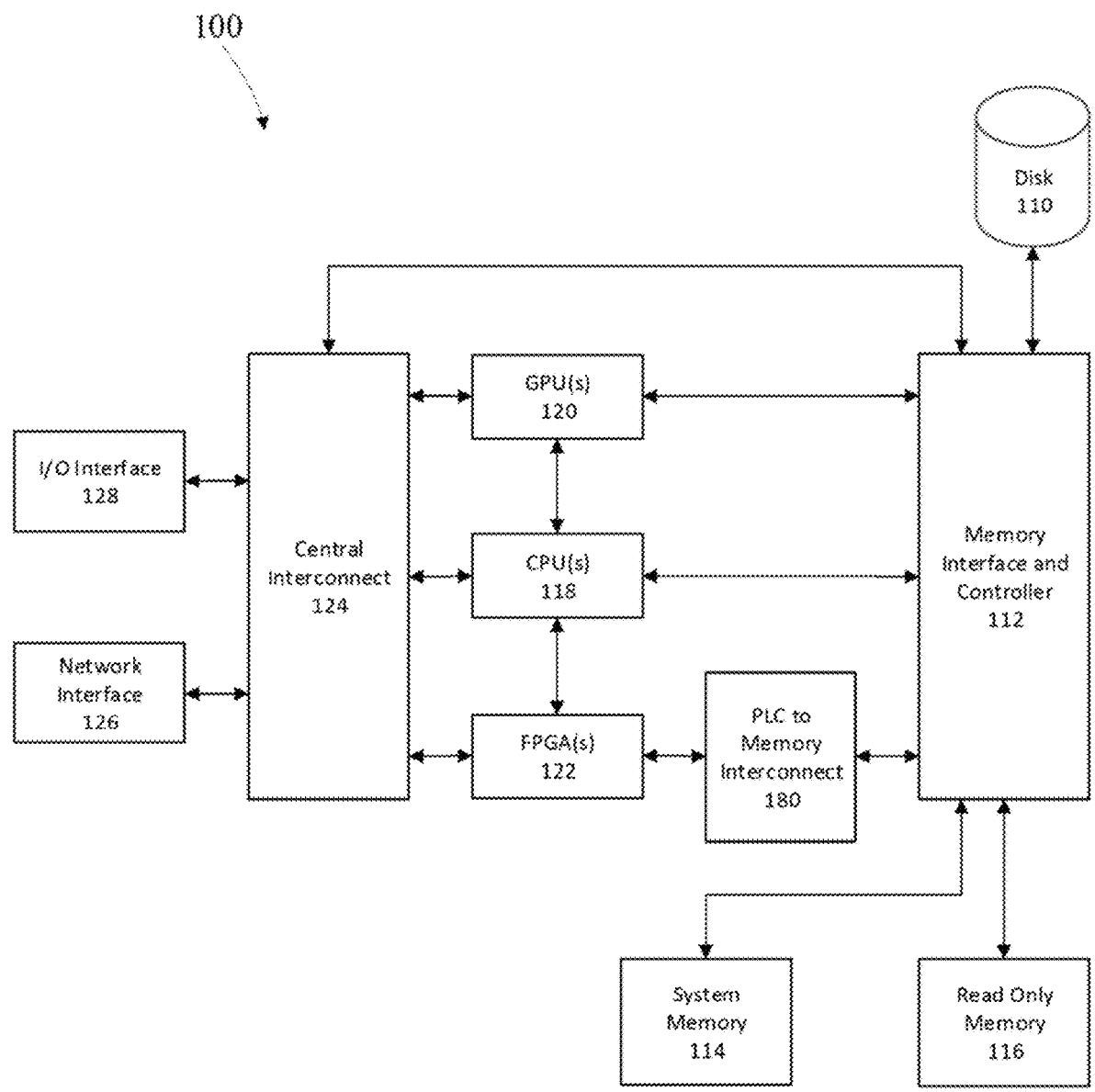
FIG. 1 is a first example system diagram in accordance with one embodiment of the disclosure.

FIG. 1 depicts an example hybrid computational system 100 that may be used to implement neural nets associated with the operation of one or more portions or steps of the processes. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
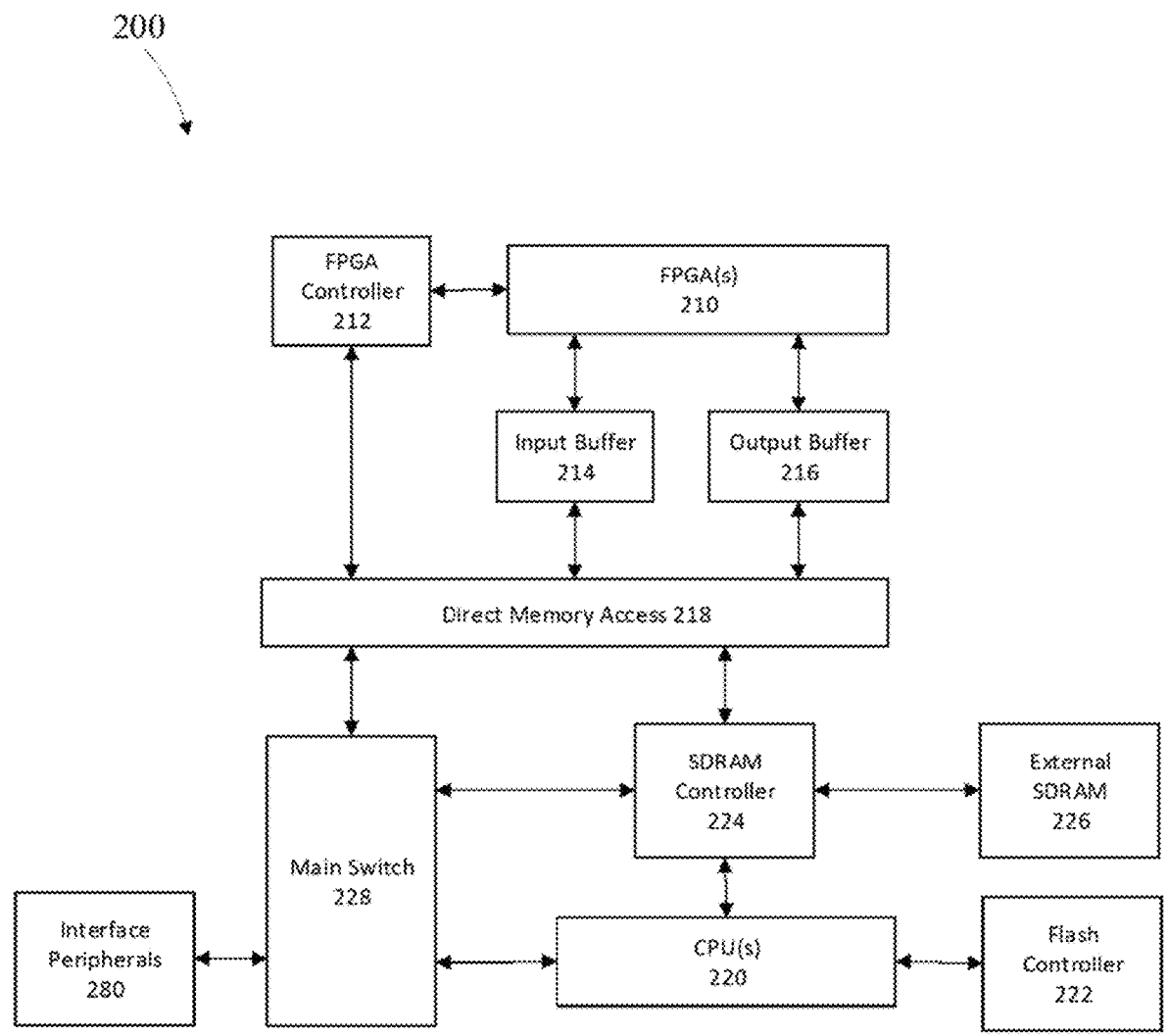
FIG. 2 is a second example system diagram in accordance with one embodiment of the disclosure.

FIG. 2 depicts a second example hybrid computational system 200 that may be used to implement neural nets associated with the operation of one or more portions or steps of process 1000. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

An image sensor may be a rolling shutter sensor. A higher-resolution main camera having a capture resolution for example of 12 Mega-pixels (12 MP) may capture images at 30 frames per second (fps) or slower frame rate. A lower-resolution secondary camera for example 2 MP may be capable of a higher frame rates such as 60 fps. The secondary camera may be mounted proximate to the main camera and the optical axis may be similar for the main and secondary cameras.

Due to the frame rate differences, there may be multiple secondary image frames captured by the secondary camera for one main image frame captured by the main camera. Global motion may be determined by matching information between secondary image frames and main image frames during a main image frame integration time.

Different pixel lines in the main image frame may share a time-delayed motion kernel of a continuous motion kernel. A line-by-line varying kernel deconvolution may be applied to the main image frame to achieve simultaneous de-motion blur and de-rolling shutter effects.

The secondary image frames from the secondary camera may provide information of time-sampled motion information, from which a motion blur kernel may be constructed. Additionally, the secondary image frame may provide continuous time motion information which facilitates a simultaneous de-motion blur removal and rolling shutter effect removal. The low-resolution, high-frame rate secondary camera may be a global shutter camera, which may provide an estimation of the motion kernel.

In a CMOS image sensor, light is captured from the environment through the camera lens onto the sensor surface. The sensor converts these photons into current, and hence generates a brightness (either single channel gray levels or multiple channels color levels) of a two-dimensional image by integrating the captured light over an exposure time. If the camera is moved during the integration time, the integration may be polluted by this motion. This type of movement during integration is common and may be caused for example by an unstable camera holder, a shaking hand, and the like. This type of pollution is known as motion blur.

In higher resolution sensors, the buffer for reading out the data may be large, and the data may not be stored by the sensor. Thus currently, a rolling shutter technique may be utilized to integrate and read out high resolution sensor data line-by-line.

Figure 3:
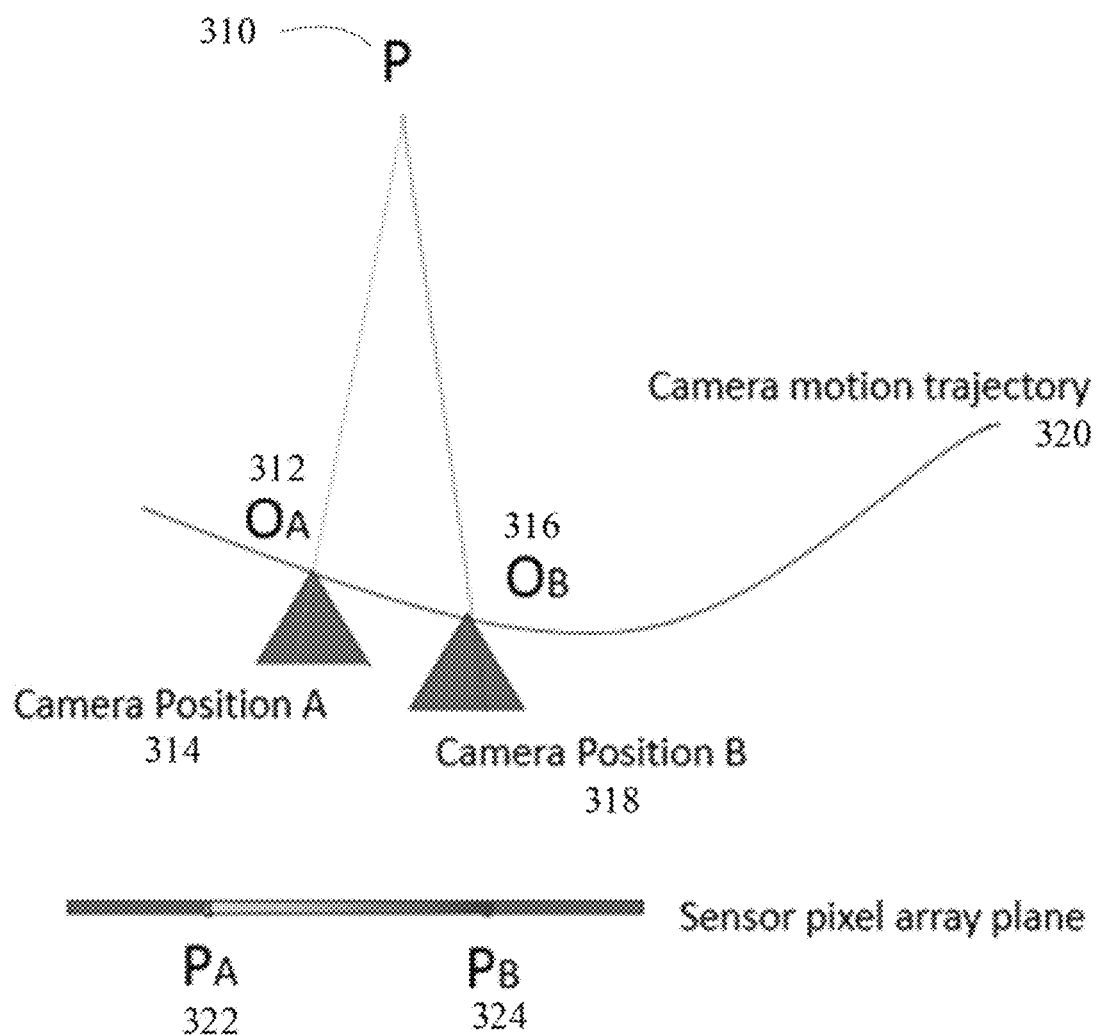
FIG. 3 is an example of optics of camera motion blur in accordance with one embodiment of the disclosure.

A camera imaging system may be described in terms of an integration process. FIG. 3 depicts global motion blur effects driven by the motion of a camera during integration. For a physical point P 310, when the camera is stable in position A 314, the optical center of the lens labelled as OA 312 projects an image of the point on a sensor pixel array plane is PA 322. When the camera is moved to position B 318, the optical center is moved to position OB 316, and its projected image may be moved to PB 324. When this movement occurs during an exposure, i.e. a single frame integration time, the camera optical center will have been moved from position A 314 to position B 318 along a camera motion trajectory 320. This movement may be projected onto the sensor pixel array plane, from position PA 322 to PB 324, thus the resulting image of physical point P 310 may exhibit camera motion blur.

An example of rolling shutter, pixels in some lines, rows, may begin integration at a time that is delayed from a previous line or row. This may lead to row and line related distortions if motion is present, either of the camera or the subject. Global shutter may be free of such rolling shutter artifacts limited to the memory/buffer of the sensor.

Figure 4:
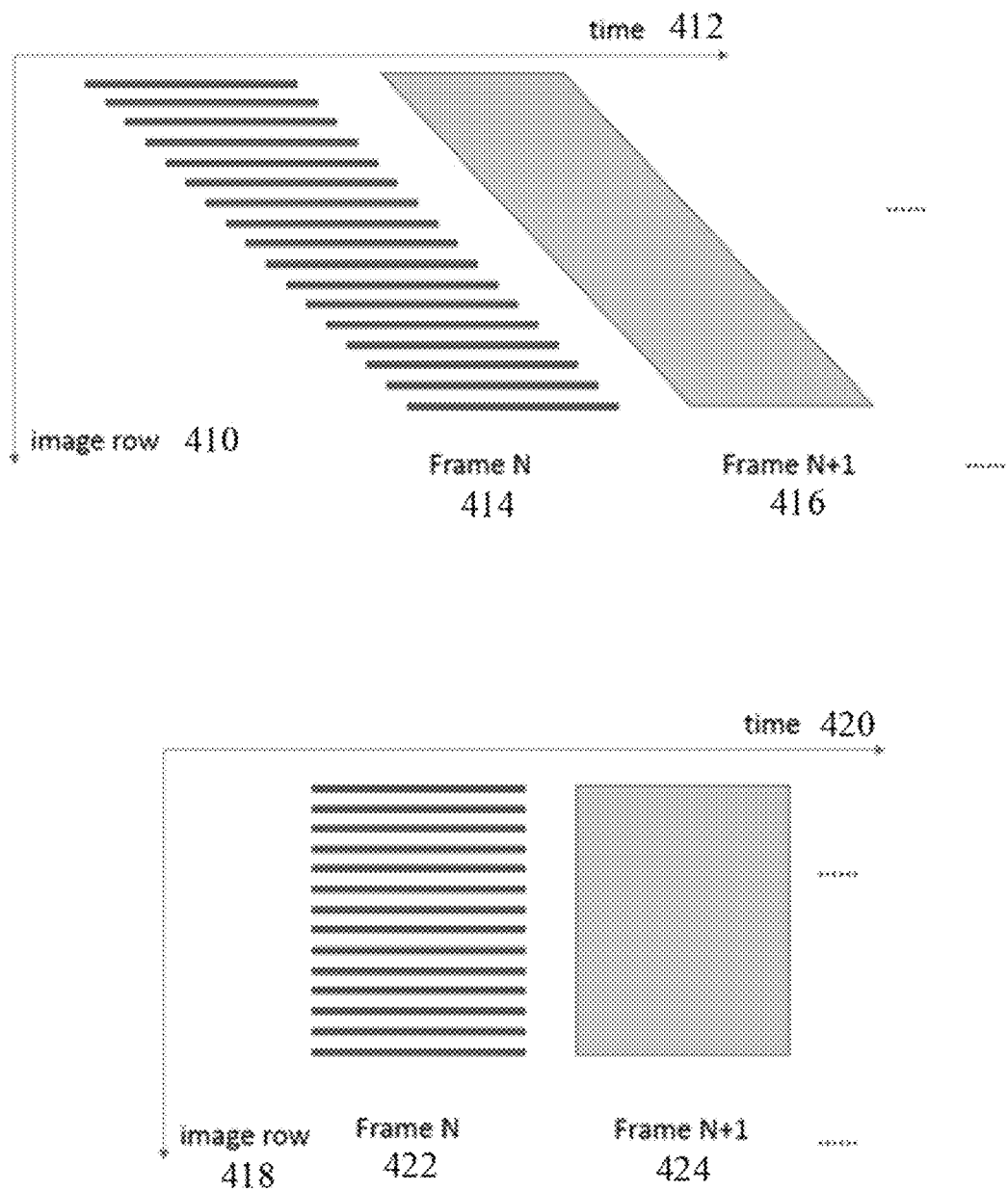
FIG. 4 is an example of rolling shutter and global shutter in accordance with one embodiment of the disclosure.

FIG. 4 depicts a rolling shutter, having N-th frame 414 and (N+1)-th frame 416 taken over time 412 for image rows 410. In a rolling shutter, the integration start time of a row is delayed from the previous row. The global shutter occurs over a time 420 for image rows 418. In a global shutter, N-th frame 422 and (N+1)-th frame 424 are taken over the time 420. In a global shutter, the integration start time of a row is started at the same point in time. The simultaneous reduction of rolling shutter artifacts and global motion blur effect is essentially a reduction of coupled distortion.

Figure 5:
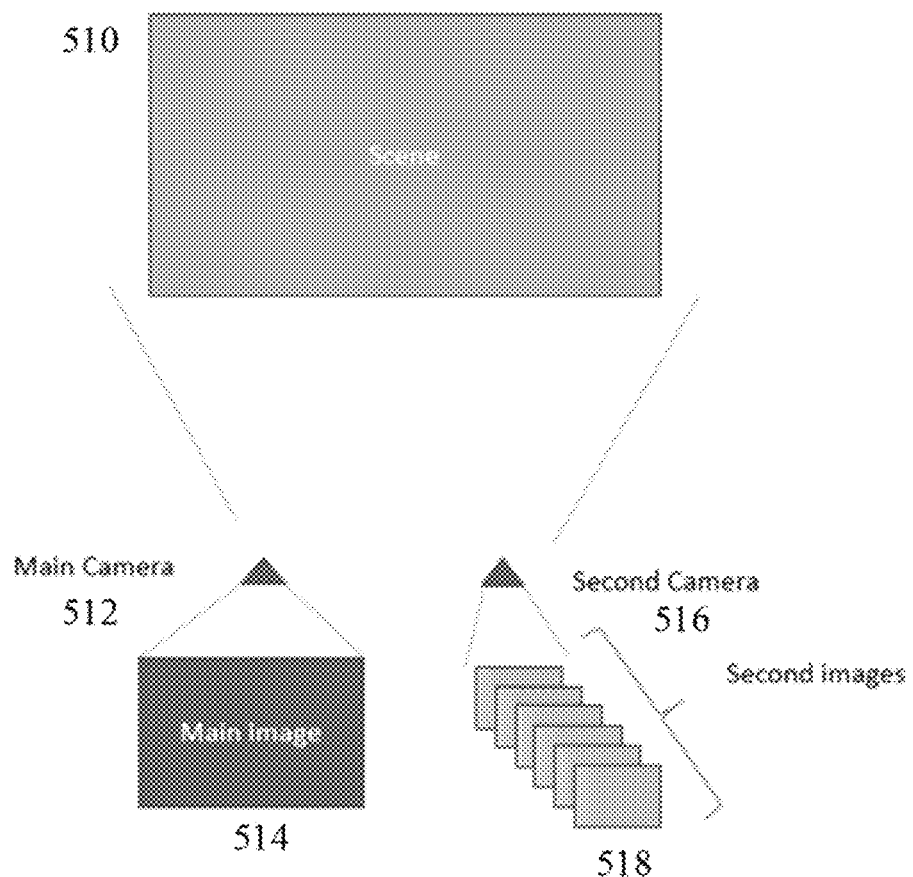
FIG. 5 is an example of a dual camera system in accordance with one embodiment of the disclosure.

FIG. 5 depicts an example dual camera system where the main camera and secondary camera are proximate. In this example, the main camera resolution is higher than the secondary camera resolution and the main camera frame rate is slower than the secondary camera frame rate. In this example the main camera is a digital image camera with a resolution of 12 MP or higher and has a frame rate of 30 fps, or lower. The secondary camera has a lower resolution than the main camera and a higher frame rate, such as 4 times or greater that of the main camera.

As depicted in FIG. 5, a scene 510 may be captured by a main camera 512 having a high resolution, low frame rate, a rolling shutter, and capturing a main image 514 and a secondary camera 516 having a low resolution, high frame rate, a global shutter, and capturing second images 518. Because the frame rate of the secondary camera is high, to ensure an acceptable brightness, a monochrome color filter may be utilized. The two cameras may be geometrically calibrated, and the output images rectified to output a similar view and format. The calibration and rectification utilized may be performed by direct linear transformation.

Figure 6:
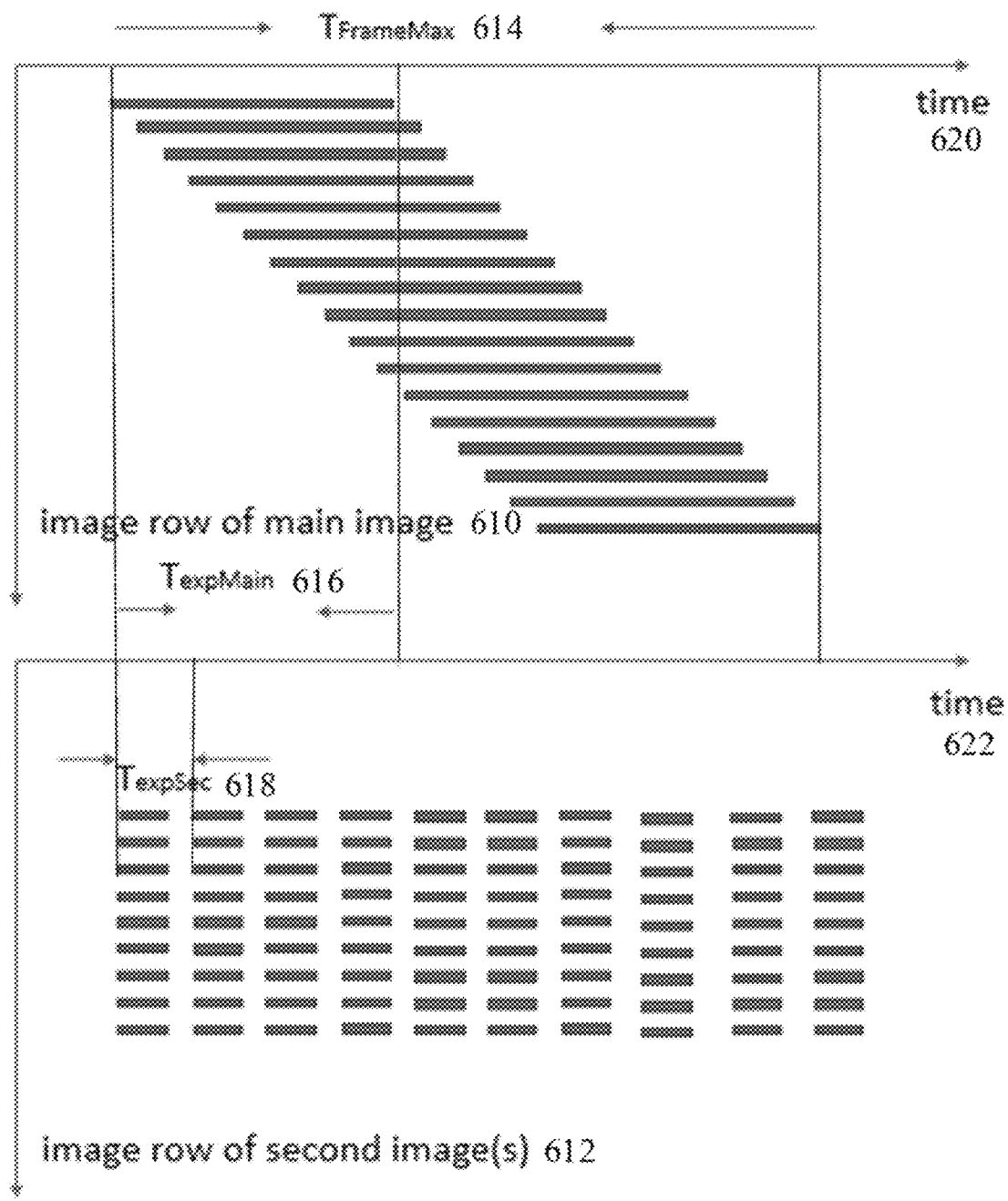
FIG. 6 is an example of timing of the main camera and secondary camera in capturing images in different frame rates with a controlled synchronization in accordance with one embodiment of the disclosure.

FIG. 6 depicts a timing sequence of the main camera and secondary camera in capturing images at different frame rates with controlled synchronization.

The exposure time, i.e. integration, of the main rolling shutter camera is denoted as $T_{expMain}$, and the total time from starting integration through the end of the integration of the last line is denoted as $T_{FrameMax}$.

The secondary camera utilizes full-frame exposure global shutter camera, so that the exposure time $T_{expSec}$ is almost identical to the period of the exposures, where $T_{expSec}$ is less than $T_{expMain}$ of the main camera. The secondary camera frame rate is greater than the main camera frame rate.

The secondary camera provides a sequence of image frames that are taken at fixed intervals during the exposure duration of the main camera. The images from the secondary camera may be denoted as $I_{sec}(i)$, i=0, 1, 2, . . . . The exposure duration of $I_{sec}(i)$ may be from TStart(i) through TEnd(i). Since the secondary camera is running in a high frame rate mode, the exposure time is relatively very short, and thus the secondary image is captured at T(i)=(TStart(i)+TEnd(i))/2.

To reduce global motion blur, de-convolution may be utilized. Thus, the global alignment of an image to its previous frame given by $$\begin{pmatrix} u \\ v \end{pmatrix} = \begin{pmatrix} \cos\theta & \sin\theta & \Delta x \\ -\sin\theta & \cos\theta & \Delta y \end{pmatrix} \begin{pmatrix} x \\ y \\ 1 \end{pmatrix} \quad (1)$$

where (x, y) is the horizontal and vertical coordinates of a pixel in a frame, after an around-axis rotation θ and translation (Δx, Δy) the coordinates are translated to (u, v), and be aligned with the previous frame. Since the de-convolution process is implemented in the imaging plane, the around-axis rotation θ may be further omitted. i.e., this transform follows the optical flow constraint and thus the object function is $$(\theta, \Delta x, \Delta y) \rightarrow (\Delta x, \Delta y) = \operatorname{argmin}_{u,v} \left\{ u\frac{\partial I}{\partial x} + v\frac{\partial I}{\partial y} + \frac{\partial I}{\partial t} \right\} \quad (2)$$

The translation of a frame from the reference frame, i.e. the first frame is achieved, denoted as $(\Delta x_i, \Delta y_i)$, i=0, 1, 2, . . . . In one example, the motion should be of second order smoothness and continuity, for example, achieved by spline interpolation, a continuous motion path C(t)={x(t),y(t)} may be estimated.

$$C(t) = \{x(t), y(t)\} = \operatorname{interpolate}\{\{x_i, y_i\}, T_i\} \quad (3)$$

In this example trajectory, the tangent vector may represent the motion velocity vector of the camera when capturing the sequence.

$$\vec{v}(t) = \begin{pmatrix} x'(t) \\ y'(t) \end{pmatrix} \quad (4)$$

The faster the motion, the weaker the kernel strength is at this position is. So the initial, un-normalized discrete kernel can be set to $$MotionDensity(T_i) = MotionDensity(x(T_i), y(T_i)) = \frac{1}{|v(T_i)|}, \quad (5)$$

$$i = 0, 1, 2 \ldots$$

Using the discrete kernel data $$\left\{x(T_i), y(T_i), \frac{1}{|v(T_i)|}\right\}, \text{ where } \forall T_i \in [0, T_{Framemax}], i = 0, 1, 2 \ldots$$

a global continuous kernel, point spread function, may be estimated as $$PSF_{frame}(x, y) = PSFEstimate\left(\left\{x(T_i), y(T_i), \frac{1}{|v(T_i)|}\right\}\right), \quad (6)$$

$$\forall T_i \in [0, T_{Framemax}], i = 0, 1, 2 \ldots, (x, y) \in C(t)$$

using the range $[0, T_{Framemax}]$.

In FIG. 6 the first row of the main image frame is integrated within time $[0, T_{expMain}]$, and the second row is integrated within time $[\Delta t_{row}, \Delta t_{row}+T_{expMain}]$, and so forth, where $\Delta t_{row}$ is the speed of the rolling shutter, consecutive rows start to integrate with a time delay of $\Delta t_{row}$. In general the k-th row of the image is integrated within time $[k \times \Delta t_{row}, k \times \Delta t_{row}+T_{expMain}]$, k=0, 1, 2, . . . H−1.

The example solution estimates the kernel for individual row (k-th row) using the data within $[k \times \Delta t_{row}, k \times \Delta t_{row}+T_{expMain}]$.

$$PSF_{row(k)}(x, y) = PSFEstimate\left\{\left\{x(T_i), y(T_i), \frac{1}{|v(T_i)|}\right\}\right\}, \quad (7)$$

$$\forall T_i \in [k \times \Delta t_{row}, k \times \Delta t_{row} + T_{expMain}]$$

$PSF_{row(k)}$, k=0, 1, 2, ... is similar to a moving segment of $PSF_{frame}$ in Equation (6). This allows efficient estimation of $PSF_{row(k)}$. Since in Equation (6), the non-zero values lie on $(x,y) \in C(t)$, the $PSF_{Frame}$ may be rewritten as $$PSF_{frame}(x,y) = \int_{t=0}^{TFramemax} PSF_t(C(t))dt \quad (8)$$

Thus $$PSF_{row(k)} = \int_{t=k \times \Delta t_{row}}^{(k+1) \times \Delta t_{row}} PSF_t(C(t))dt \quad (9)$$

Figure 7:
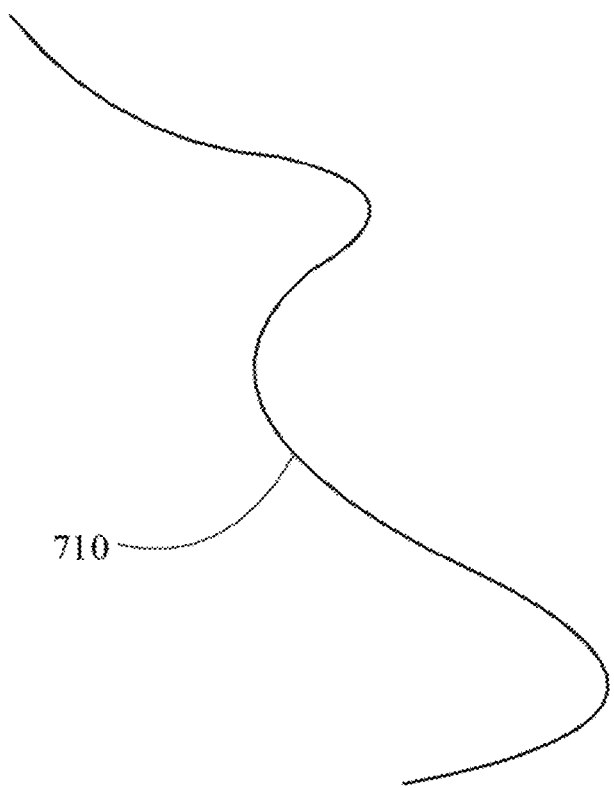
FIG. 7 is an example of a total motion blur kernel in accordance with one embodiment of the disclosure.

FIG. 7 depicts a total motion kernel 710.

Figure 8:
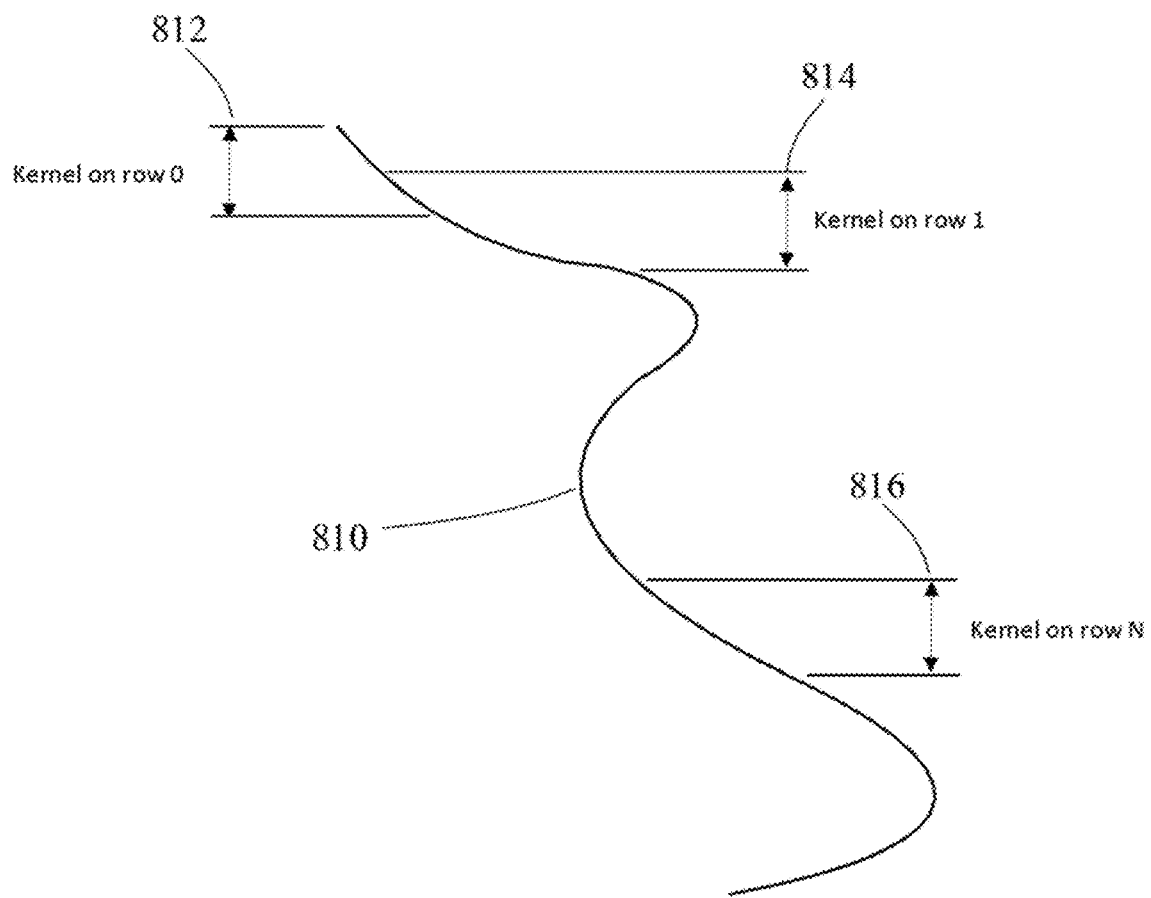
FIG. 8 is an example of a row-wise blur kernel in a rolling shutter image in accordance with one embodiment of the disclosure.

FIG. 8 depicts a row-wise motion blur kernel 810 in a rolling shutter image having a kernel on row 0 812, a kernel on row 1 814 and a kernel on row N 816.

Up to this point, the phrase PSF has not implied normalization. Going forward, the PSF applied to the image will be normalized with conservative energy.

Thus, the blurring model involving rolling shutter and global motion blur becomes $$I_{observed}(x,y) = I_{clear}(x,y) * PSF_{row(y)}(x,y) + Noise(x,y) \quad (10)$$

where Noise(x,y) is the system additive noise.

Based on a convolution model in a matrix-vector product, the blurring model may be represented as $$B = KL + N \quad (11)$$

where L, B, and N denote the column-vector forms of $I_{clear}$ (latent image), $I_{observed}$ (blurred image), and noise.

K is an image filtering matrix that applies the convolution. Rows of K are the motion blur kernel placed at pixel locations and unraveled into a row vector, K is also referred to as the blur matrix. In a spatially invariant blur, rows have the same values and are shifted in location. The spatially varying kernel may be a row-wise motion blur kernel, thus for pixels in the same row, the corresponding row of K for such pixels are the same and are shifted in location.

Given a blurred image B, a blur matrix K, and a noise level $Noise(x,y) \sim N(0, \sigma^2)$, a solution to the latent image L may be determined.

A dual camera system including a main camera with a rolling shutter and a second camera with a global shutter. In this dual camera system, there may be a controlled synchronization between the rolling shutter of the main camera and the global shutter of the second camera.

Figure 9:
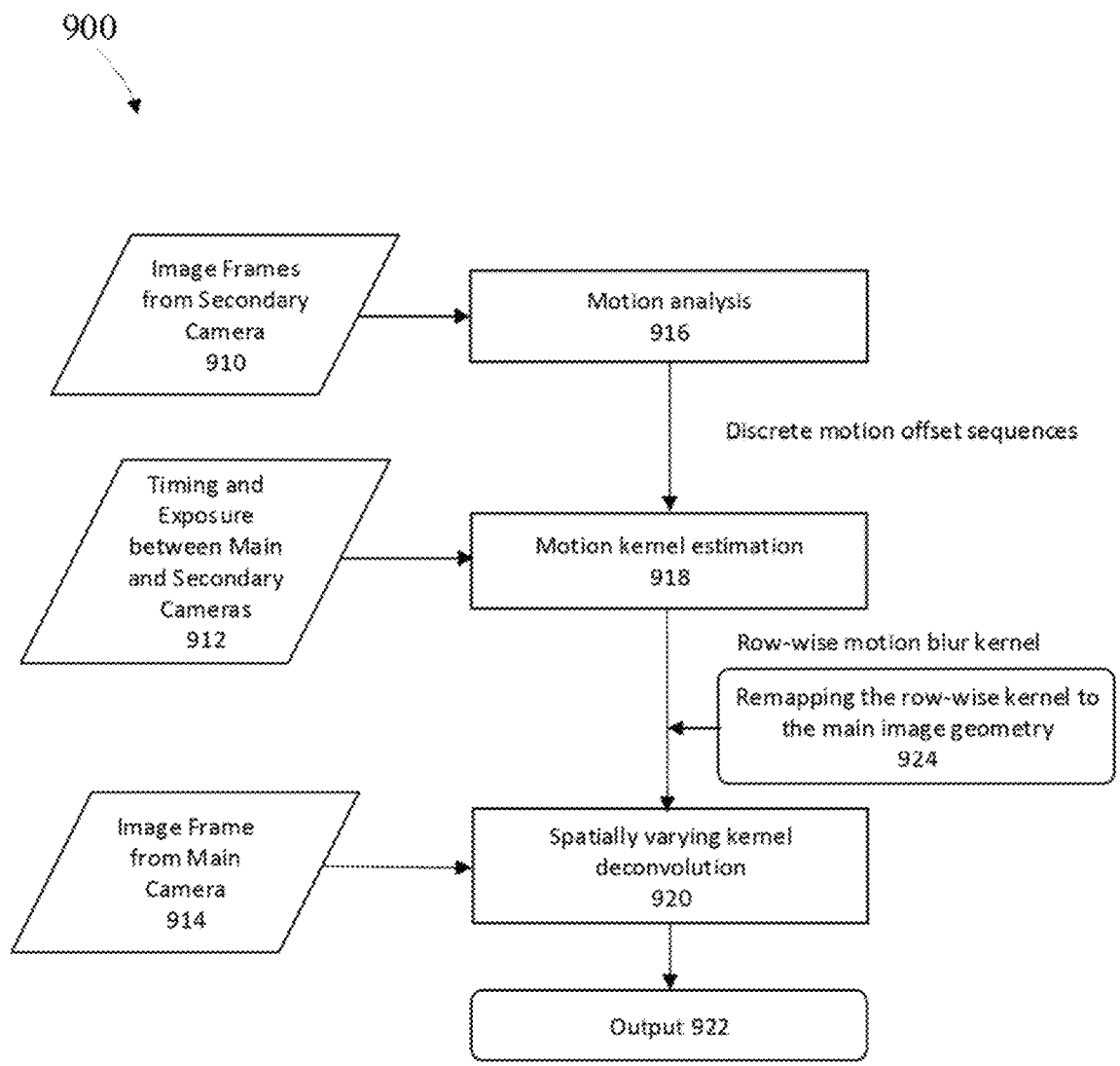
FIG. 9 is an example of a flow for a rolling shutter main camera with remapping the kernels of the second camera frames to main image geometry in accordance with one embodiment of the disclosure.

FIG. 9 depicts an example flow of mapping the estimated row-wise motion blur kernel to match the main image's geometry utilize a rolling shutter main camera and a global shutter secondary camera. The flow receives 910 secondary image frames from a secondary camera and performs motion analysis 916 on these secondary image frames, outputting discrete motion offset sequences. Timing and exposure between a main camera and a secondary camera are received 912 by a motion blur kernel estimation 918 which also receives the discrete motion offset sequences from the motion analysis 916. The motion blur kernel estimation 918 outputs a row-wise motion blur kernel and remaps 924 the row-wise motion blur kernel to the main image frame. The main image frame from the main camera is received 914 by the spatially varying kernel deconvolution 920 in addition to the remapped row-wise motion blur kernel. The output of the spatially varying kernel deconvolution 920 is a blur reduced image 922.

Figure 10:
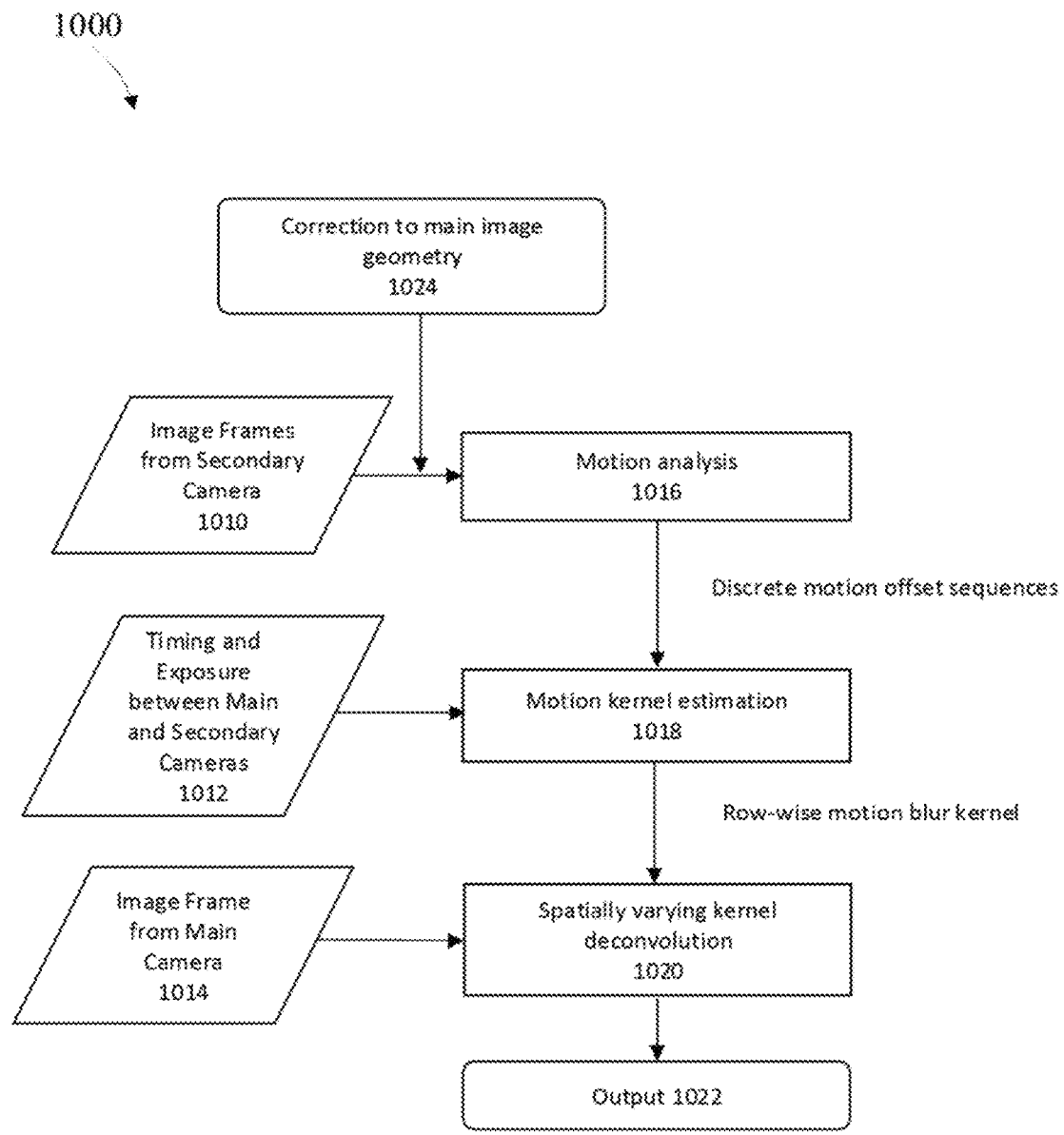
FIG. 10 is an example of a flow for a rolling shutter main camera with correcting the second camera frames to main image geometry in accordance with one embodiment of the disclosure.

FIG. 10 depicts an example flow of correcting the secondary image frames to the main image geometry before motion analysis utilize a rolling shutter main camera and a global shutter secondary camera. The flow receives 1010 secondary image frames from a secondary camera, corrects 1024 the secondary image frame to the main image frame and performs motion analysis 1016 on these secondary image frames, outputting discrete motion offset sequences. Timing and exposure between a main camera and a secondary camera are received 1012 by a motion kernel estimator 1018 which also receives the discrete motion offset sequences from the motion analysis 1016 and outputs a row-wise motion blur kernel. The main image frame from the main camera is received 1014 by the spatially varying kernel deconvolution 1020 in addition to the row-wise motion blur kernel. The output of the spatially varying kernel deconvolution 1020 is a blur reduced image 1022.

Figure 11:
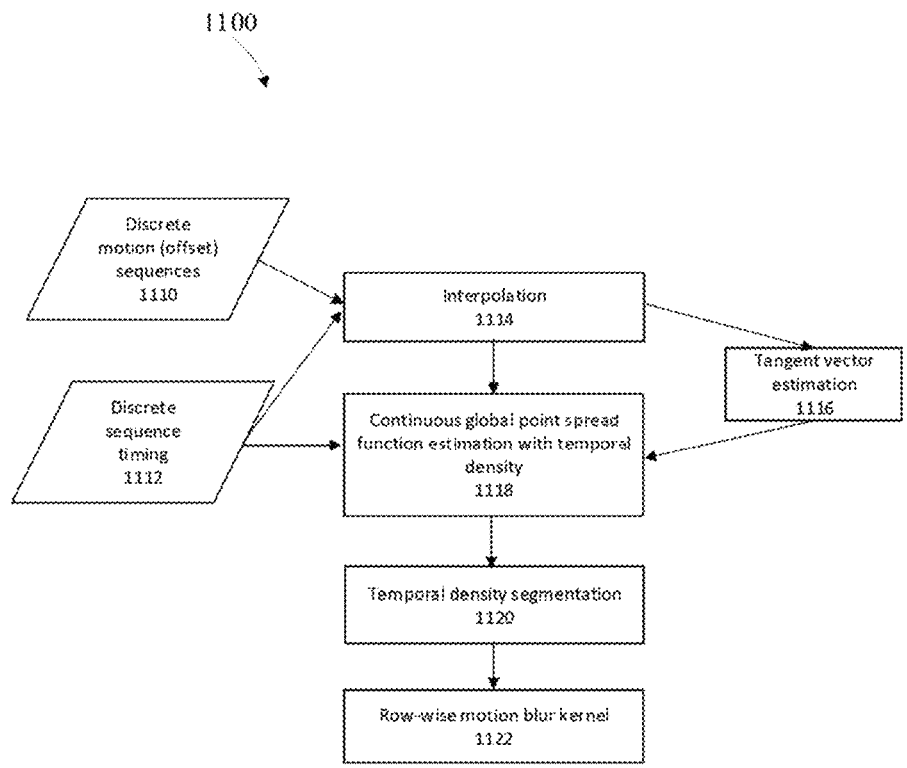
FIG. 11 is an example of a flow to generate the row-wise blur kernel in accordance with one embodiment of the disclosure.

FIG. 11 depicts an example flow to generate the row-wise motion blur kernel. Discrete motion offset sequences 1110 and discrete sequence timing 1112 are received by an interpolation module 1114. The interpolation module outputs to a tangent vector estimation module 1116 and a continuous global point spread function estimation and temporal density module 1118. The continuous global point spread function estimation and temporal density module 1118 receives discrete sequence timing 1112, output from the interpolation module 1114 and tangent vector estimation modules 1116 and sends its output to a temporal density segmentation module 1120 which then outputs to a row-wise motion blur kernel module 1122.

Figure 12:
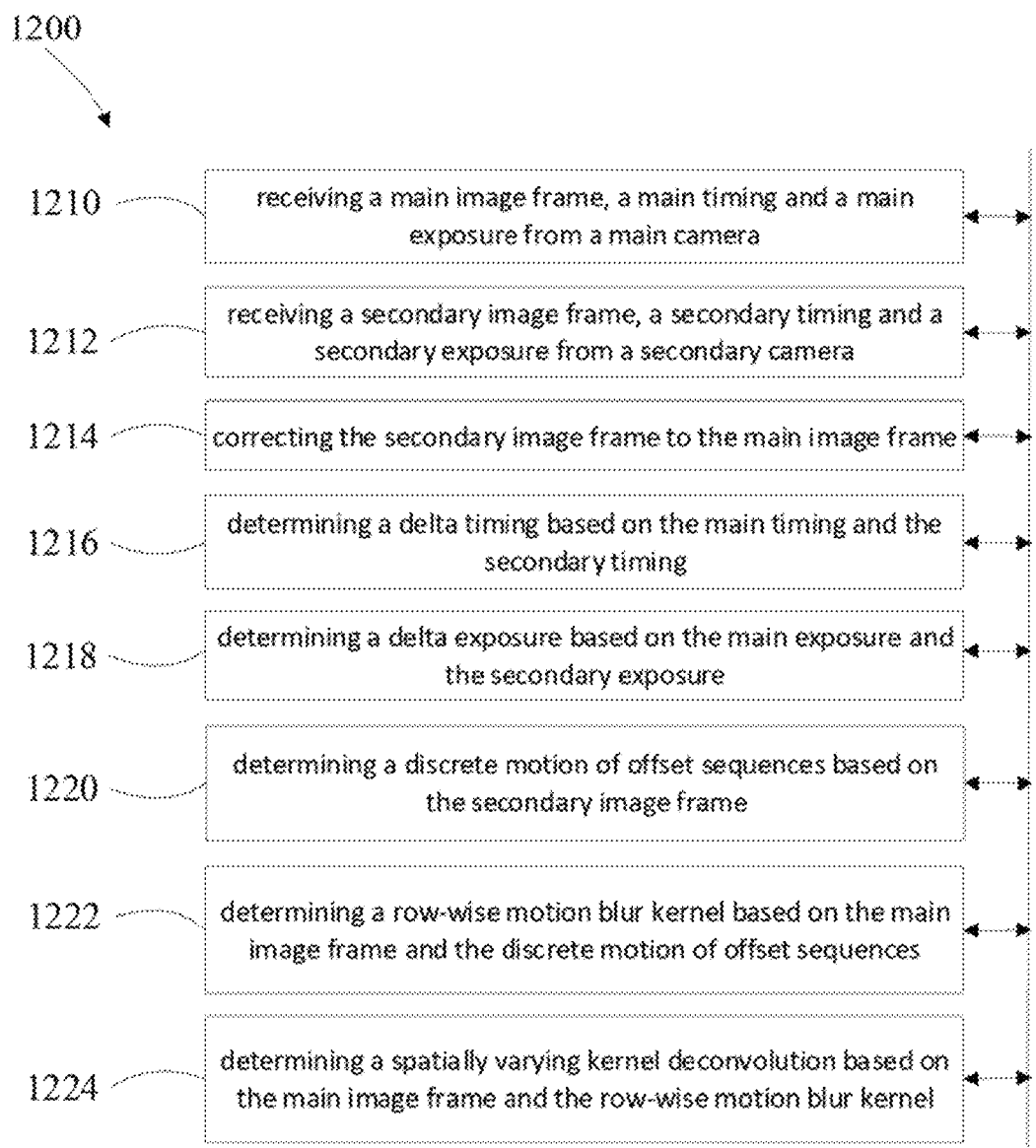
FIG. 12 is a first example method to simultaneously reduce a motion blur and a rolling shutter effect in accordance with one embodiment of the disclosure.

FIG. 12 depicts a first example method to simultaneously reduce a motion blur and a rolling shutter effect, including, receiving 1210 a main image frame, a main timing and a main exposure from a main camera, and receiving 1212 a secondary image frame, a secondary timing and a secondary exposure from a secondary camera. The method includes correcting 1214 the secondary image frame to the main image frame, determining 1216 a delta timing based on the main timing and the secondary timing and determining 1218 a delta exposure based on the main exposure and the secondary exposure. The method further includes determining 1220 a discrete motion of offset sequences based on the secondary image frame, determining 1222 a row-wise motion blur kernel based on the main image frame and the discrete motion of offset sequences and determining 1224 a spatially varying kernel deconvolution based on the main image frame and the row-wise motion blur kernel. The method may also perform correcting the geometry of the main image frame based on the secondary image frame.

Figure 13:
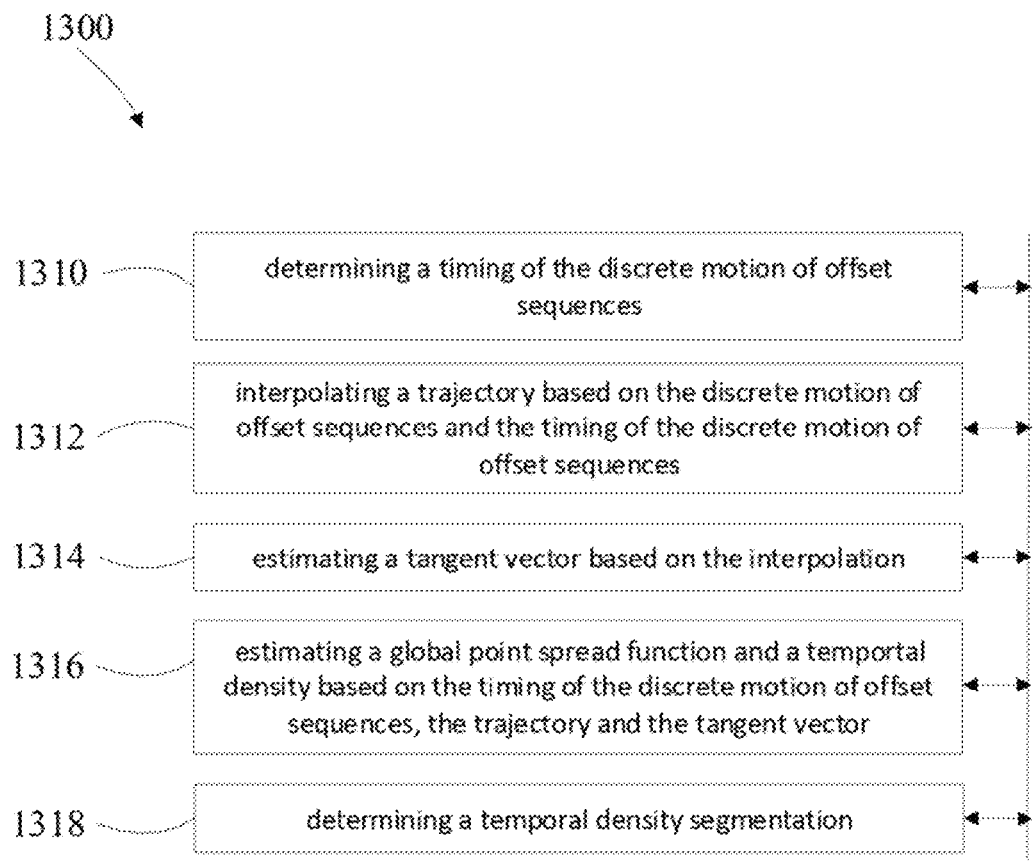
FIG. 13 is an example method to generate a temporal density segmentation in accordance with one embodiment of the disclosure.

FIG. 13 depicts an example method to generate a temporal density segmentation, including, determining 1310 a timing of the discrete motion of offset sequences and interpolating 1312 a trajectory based on the discrete motion of offset sequences and the timing of the discrete motion of offset sequences. The method further includes estimating 1314 a tangent vector based on the interpolation, estimating 1316 a global point spread function and a temporal density based on the timing of the discrete motion of offset sequences, the trajectory and the tangent vector and determining 1318 a temporal density segmentation.

Figure 14:
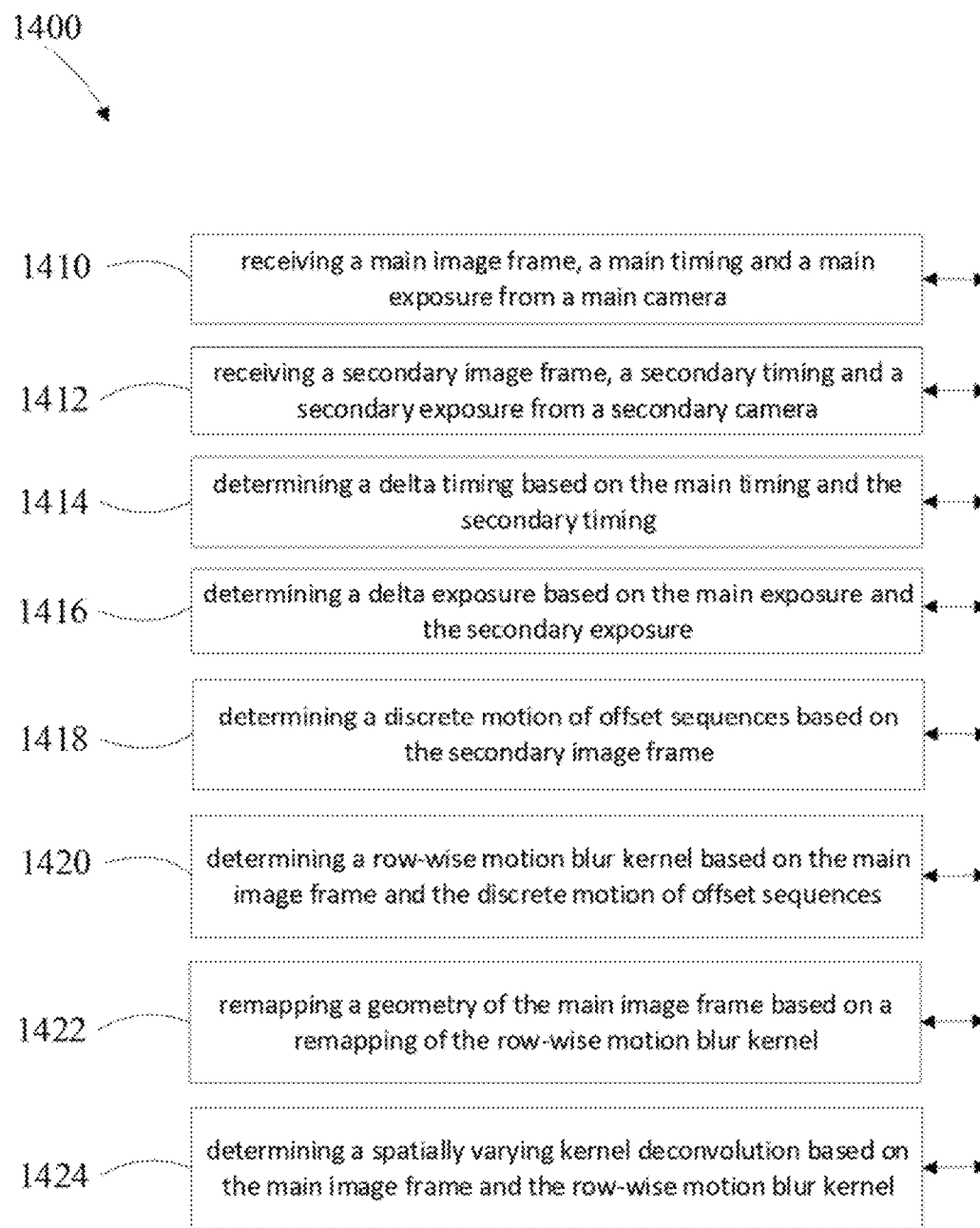
FIG. 14 is a second example method of quantization evaluation in accordance with one embodiment of the disclosure.

FIG. 14 depicts a second example method to reduce a motion blur and a rolling shutter effect, including, receiving 1410 a main image frame, a main timing and a main exposure from a main camera and receiving 1412 a secondary image frame, a secondary timing and a secondary exposure from a secondary camera. The method includes determining 1414 delta timing based on the main timing and the secondary timing, determining 1416 a delta exposure based on the main exposure and the secondary exposure and determining 1418 a discrete motion of offset sequences based on the secondary image frame. The method further includes determining 1420 a row-wise motion blur kernel based on the main image frame and the discrete motion of offset sequences, remapping 1422 the row-wise motion blur kernel to the main image frame and determining 1424 a spatially varying kernel deconvolution based on the main image frame and the row-wise motion blur kernel.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation, or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method to reduce a motion blur and a rolling shutter effect, comprising:
   receiving a main image frame, a main timing and a main exposure from a main camera;
   receiving a secondary image frame, a secondary timing and a secondary exposure from a secondary camera;
   correcting the secondary image frame to the main image frame;

determining a delta timing based on the main timing and the secondary timing;

determining a delta exposure based on the main exposure and the secondary exposure;

determining a discrete motion of offset sequences based on the secondary image frame;

determining a row-wise motion blur kernel based on the main image frame and the discrete motion of offset sequences; and determining a spatially varying kernel deconvolution based on the main image frame and the row-wise motion blur kernel.

2. The method to reduce the motion blur and the rolling shutter effect of claim 1, further comprising:

determining a timing of the discrete motion of offset sequences;

interpolating a trajectory based on the discrete motion of offset sequences and the timing of the discrete motion of offset sequences;

estimating a tangent vector based on the interpolation;

estimating a global point spread function and a temporal density based on the timing of the discrete motion of offset sequences, the trajectory and the tangent vector; and determining a temporal density segmentation.

3. The method to reduce the motion blur and the rolling shutter effect of claim 1, wherein a main camera resolution is higher than a secondary camera resolution.

4. The method to reduce the motion blur and the rolling shutter effect of claim 1, wherein a main camera frame rate is slower than a secondary camera frame rate.

5. The method to reduce the motion blur and the rolling shutter effect of claim 1, wherein the secondary camera has a monochrome color filter.

6. The method to reduce the motion blur and the rolling shutter effect of claim 1, further comprising:

calibrating the secondary camera to the main camera; and rectifying the secondary image frame to the main image frame.

7. The method to reduce the motion blur and the rolling shutter effect of claim 6, wherein the calibrating and rectifying is direct linear transformation.

8. A method to reduce a motion blur and a rolling shutter effect, comprising:

receiving a main image frame, a main timing and a main exposure from a main camera;

receiving a secondary image frame, a secondary timing and a secondary exposure from a secondary camera;

determining a delta timing based on the main timing and the secondary timing;

determining a delta exposure based on the main exposure and the secondary exposure;

determining a discrete motion of offset sequences based on the secondary image frame;

determining a row-wise motion blur kernel based on the main image frame and the discrete motion of offset sequences;

remapping the row-wise motion blur kernel to the main image frame; and determining a spatially varying kernel deconvolution based on the main image frame and the row-wise motion blur kernel.

9. The method to reduce the motion blur and the rolling shutter effect of claim 8, further comprising:

determining a timing of the discrete motion of offset sequences;

interpolating a trajectory based on the discrete motion of offset sequences and the timing of the discrete motion of offset sequences;

estimating a tangent vector based on the interpolation;

estimating a global point spread function and a temporal density based on the timing of the discrete motion of offset sequences, the trajectory and the tangent vector; and determining a temporal density segmentation.

10. The method to reduce the motion blur and the rolling shutter effect of claim 8, further comprising:

calibrating the secondary camera to the main camera; and rectifying the secondary image frame to the main image frame.

* * * * *